United States Patent [19]

Huber

[11] 4,260,361

[45] Apr. 7, 1981

[54] RESONANT OR PULSATING COMBUSTION HEATING APPARATUS

[76] Inventor: Ludwig Huber, Saarland St. 15, 7000 Stuttgart 80, Fed. Rep. of Germany

[21] Appl. No.: 969,905

[22] Filed: Dec. 15, 1978

[30] Foreign Application Priority Data

Oct. 10, 1978 [DE] Fed. Rep. of Germany ....... 2844095

[51] Int. Cl.³ ............................................. F23C 11/04
[52] U.S. Cl. ....................................... 431/1; 431/347; 431/351; 60/39.77; 60/247
[58] Field of Search ....................... 431/1, 2, 157, 347, 431/351; 60/39.77, 247

[56] References Cited

U.S. PATENT DOCUMENTS

| | | | |
|---|---|---|---|
| 2,715,436 | 8/1955 | Lafferentz et al. | 60/39.77 X |
| 2,717,637 | 9/1955 | Huber | 431/1 |
| 2,719,580 | 10/1955 | Haag et al. | 431/1 |
| 2,839,046 | 6/1958 | Kamm | 431/1 X |

FOREIGN PATENT DOCUMENTS

| | | | |
|---|---|---|---|
| 922731 | 1/1955 | Fed. Rep. of Germany | 431/1 |
| 300706 | 10/1954 | Switzerland | 431/1 |
| 424955 | 12/1933 | United Kingdom | 431/1 |
| 728724 | 4/1955 | United Kingdom | 60/39.77 |

Primary Examiner—Robert S. Ward, Jr.
Attorney, Agent, or Firm—Michael F. Petock

[57] ABSTRACT

A resonant or pulsating combustion heating apparatus of the present invention provides a high thermal efficiency heater with low concentrations of carbon monoxide and nitrogen oxides in the exhaust gas. The pulsation heater is constructed to provide an afterburner or late-combustion reactor in the pulsation tube. Combustion in the combustion chamber is of a relatively rich fuel/air mixture in which no nitrogen oxides are produced. The afterburning in the pulsation tube is carried out in the presence of excess air providing late combustion to remove carbon monoxide (CO).

7 Claims, 8 Drawing Figures

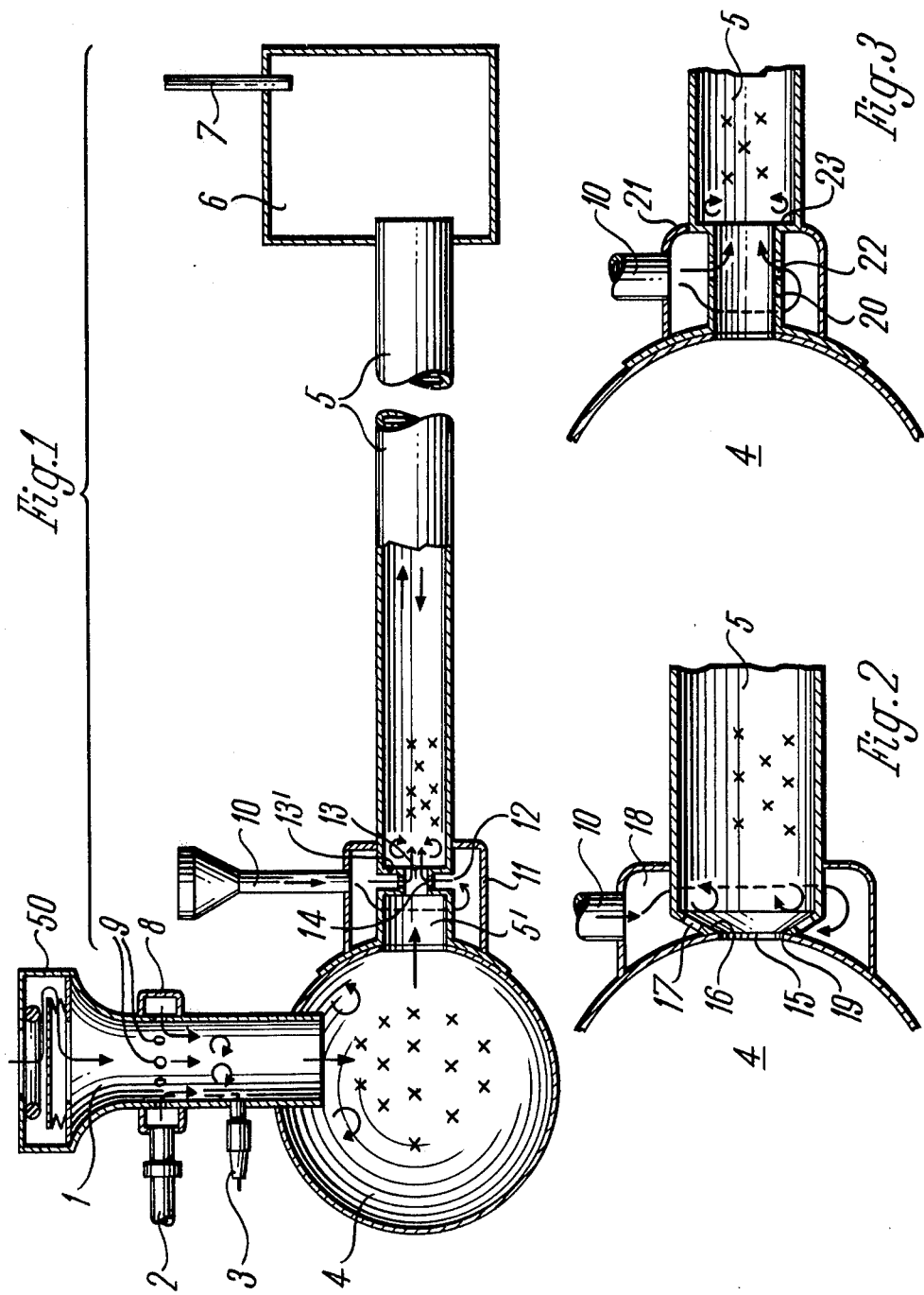

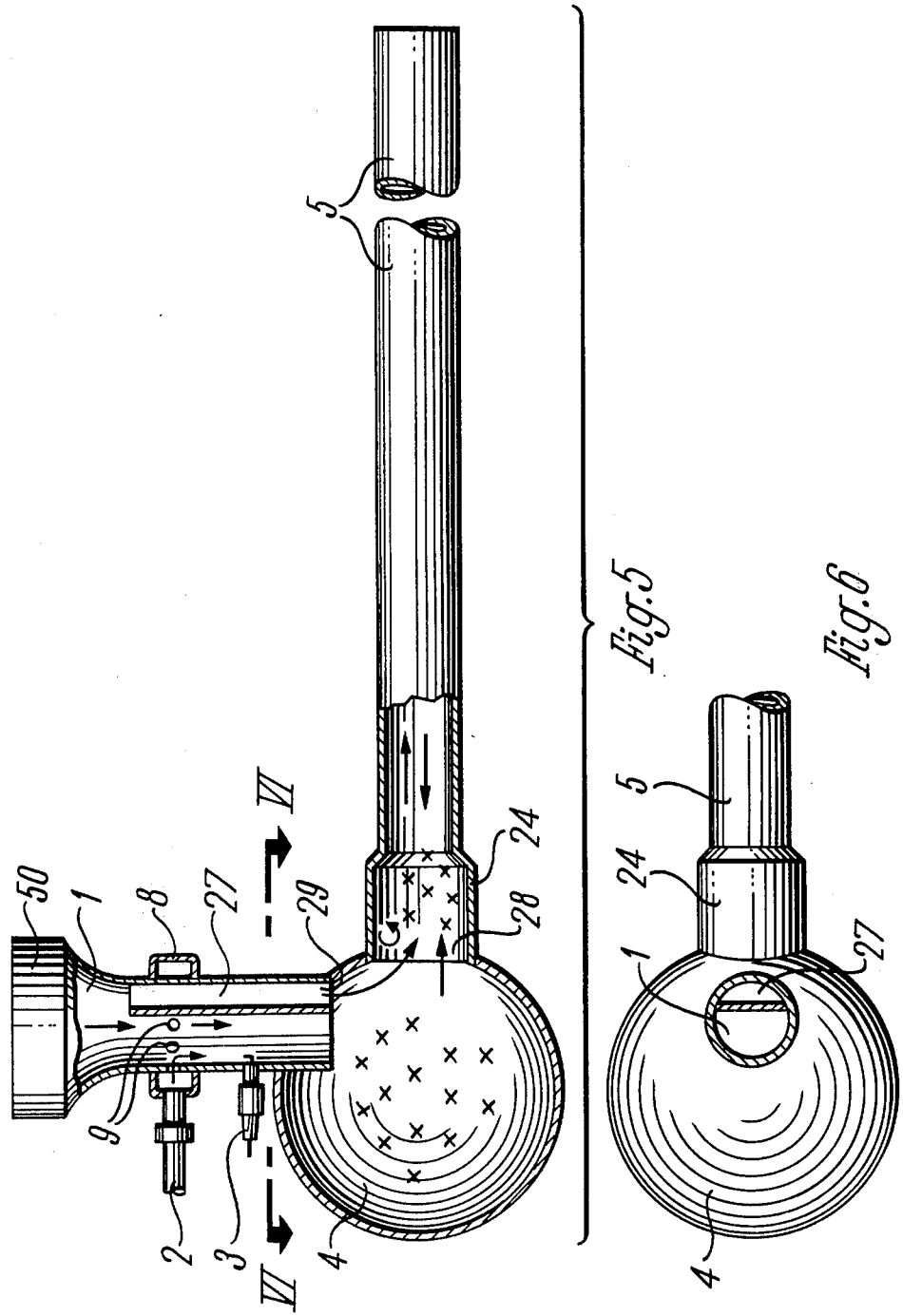

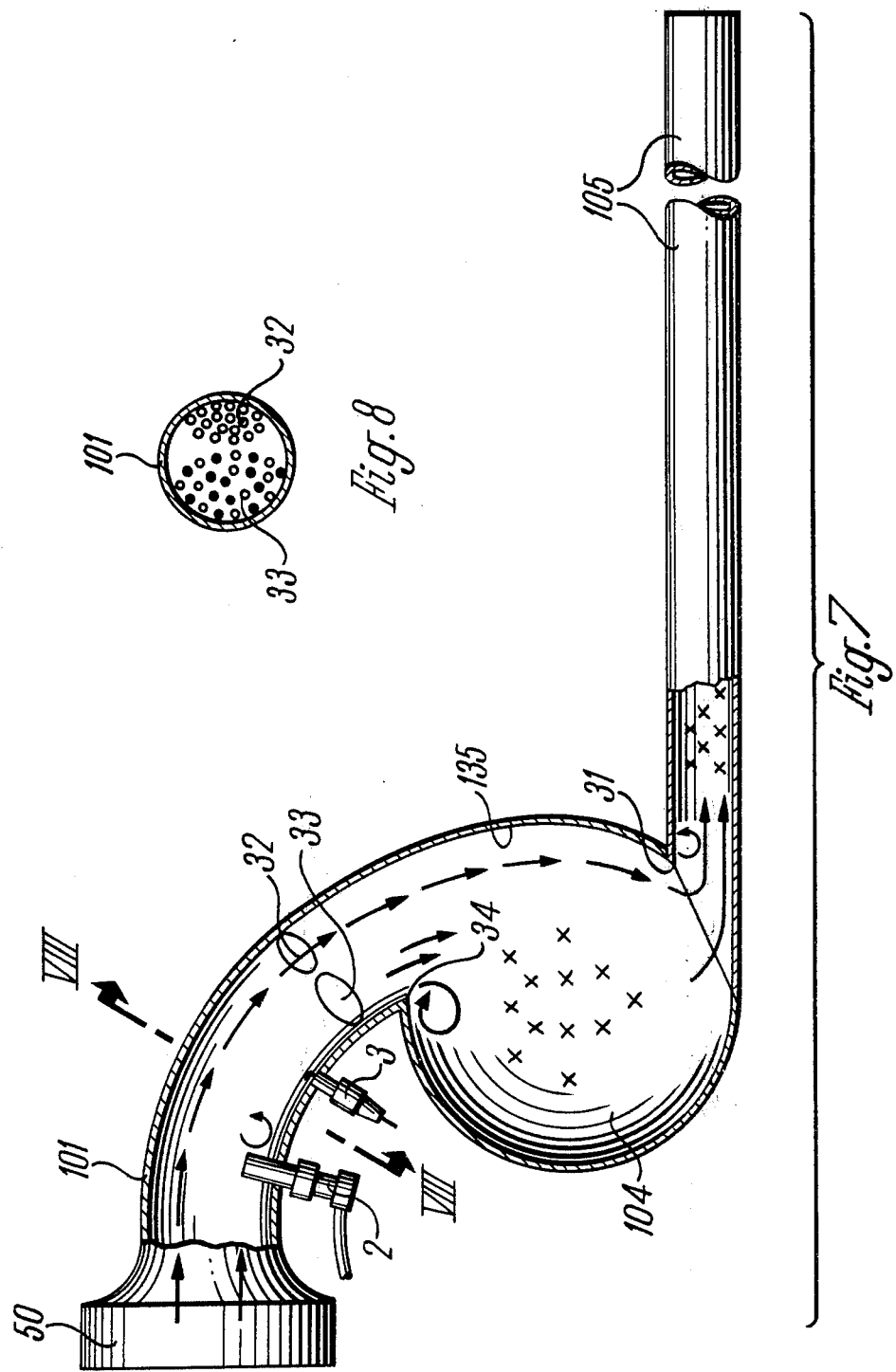

RESONANT OR PULSATING COMBUSTION HEATING APPARATUS

BACKGROUND OF THE INVENTION

The present invention relates to a resonont or pulsating combustion heating apparatus. More particularly, the present invention relates to a pulsation heating apparatus in which the exhaust gas is low in noxious components, particularly carbon monoxide (CO) and nitrogen oxides ($NO_x$).

These types of pulsation heating units are known. (Refer to ATZ Automobiltechnische Zeitschrift, vo. 66, issue 2 (February 1964), pp. 31–37). They function on the following principle: By way of the suction pipe and the fuel inlet the fuel/air mixture entering the combustion chamber explodes, i.e., combusts explosively in the combustion chamber. The exhaust gas mixture takes place in the pulsation tube at approximately 100 to 130 hz., determined primarily by its length. During the negative half-cycle of the pressure fluctuation (pulsation) fuel/air mixture is sucked into the combustion chamber; during the positive half-cycle it is ignited. A stable pulsing combustion exists. The resulting heat is removed from the pulsation tube, e.g., by means heating cold air currents or heating water.

The regulation of the existing fuel/air mixture for the combustion in general is such that the air coefficient is somewhat less than 1. The air coefficient is the air/fuel ratio. It is equal to 1 in a stoichiometric combustion. In order to easily attain a steady drive even in a cold apparatus and/or at low outside temperatures, the combustion is relatively "rich", i.e., a fixed excess of fuel is used. However, the "richer" the combustion, the higher the concentration of carbon monoxide (CO) and unoxidized (unburned) hydrocarbons (HC) in the exhaust gas. In order to avoid these, a "lean" combustion would then be desired, i.e., using an air coefficient greater than 1 (in other words, using excess air), thereby resulting in scarcely any difficulty at low temperatures and/or on starting. Lean combustion as well has undesirable consequences, in that the nitrogen oxide ($NO_x$) concentration in the exhaust gas increases. However, even if one somehow overcomes the problems of "lean" combustion at low temperatures and/or on starting and thereby lowers the CO concentration in the exhaust gas, then the lean combustion would lead to an undesirable elevation of $NO_x$ in the exhaust gas.

SUMMARY OF THE INVENTION

The invention lies as well in the function of producing a resonant or pulsating combustion heating unit of the type mentioned at the outset in which the concentration of carbon monoxide, on one hand, and the nitrogen oxides, on the other hand, in the exhaust gas is diminished in relation to that of the known swingfire heating units. This problem will possibly will be eliminated using simple means, namely of the type that are expected to lead to trouble-free lean combustion.

In accordance with the invention this problem is solved by the characteristics specified in claim 1. The invention is further concerned with additional advantageous developments.

Accordingly, in the invention the pulsation tube is constructed as an afterburner or late-combustion reactor. First, a combustion of a relatively rich mixture occurs in the combustion chamber which, as described, is to be sought for the purpose of steady combustion and in which, in addition, no nitrogen oxides are produced. By means of an afterburner in the pulsation tube the exhaust gas components, namely, in particular carbon monoxide (CO) and the unburned hydrocarbons (HC), are then burned in the presence of excess air, thus "lean". The noxious components contained in the exhaust gas mixture are thereby characterized in that the principal combustion in the combustion chamber proceeds so that no $NO_x$ occurs, and in that the noxious components produced thereby are eliminated by the lean late-combustion in the pulsation tube. Collectively, therefore, the concentration of both CO and $NO_x$ in the exhaust gas mixture is extremely slight. What is to be regarded, in terms of the explanation given, as "relatively" lean or rich combustions, result from determinations sought directly by the specialist. The standard (rule) is that the combustion takes place in the combustion chamber with an air coefficient of less than 1 (an excess of fuel) and in the pulsation tube with an air coefficient greater than 1 (an excess of air); for example, the air coefficient may be 0.9 in the combustion chamber and 1.1 in the pulsation tube.

In constructing the pulsation tube as an afterburner the necessary precautions must be taken to provide for a continuous supply of fresh air into the pulsation tube. This is possible by various methods. Representative examples of the invention and its advantageous improvements are illustrated hereinafter.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a cross-sectional view of a resonant or pulsating combustion heating apparatus in accordance with the present invention.

FIG. 2 is a broken out cross-sectional view of a modification of the apparatus of FIG. 1 in accordance with the present invention showing a modified air intake and mixing means for the input to the pulsation tube.

FIG. 3 is a broken out cross-sectional view of a modification of the apparatus of FIG. 1 in accordance with the present invention showing a modified air intake and mixing means for the input to the pulsation tube.

FIG. 5 is a broken cross-sectional view in accordance with the present invention.

FIG. 6 is a cross-sectional view taken along line VI—VI of FIG. 5 in accordance with the present invention.

FIG. 7 is a broken out cross-sectional view of another embodiment in accordance with the present invention.

FIG. 8 is a cross-sectional view taken along line VIII—VIII of FIG. 7.

DETAILED DESCRIPTION OF THE PREFERRED EMBODIMENTS

Figure 4:
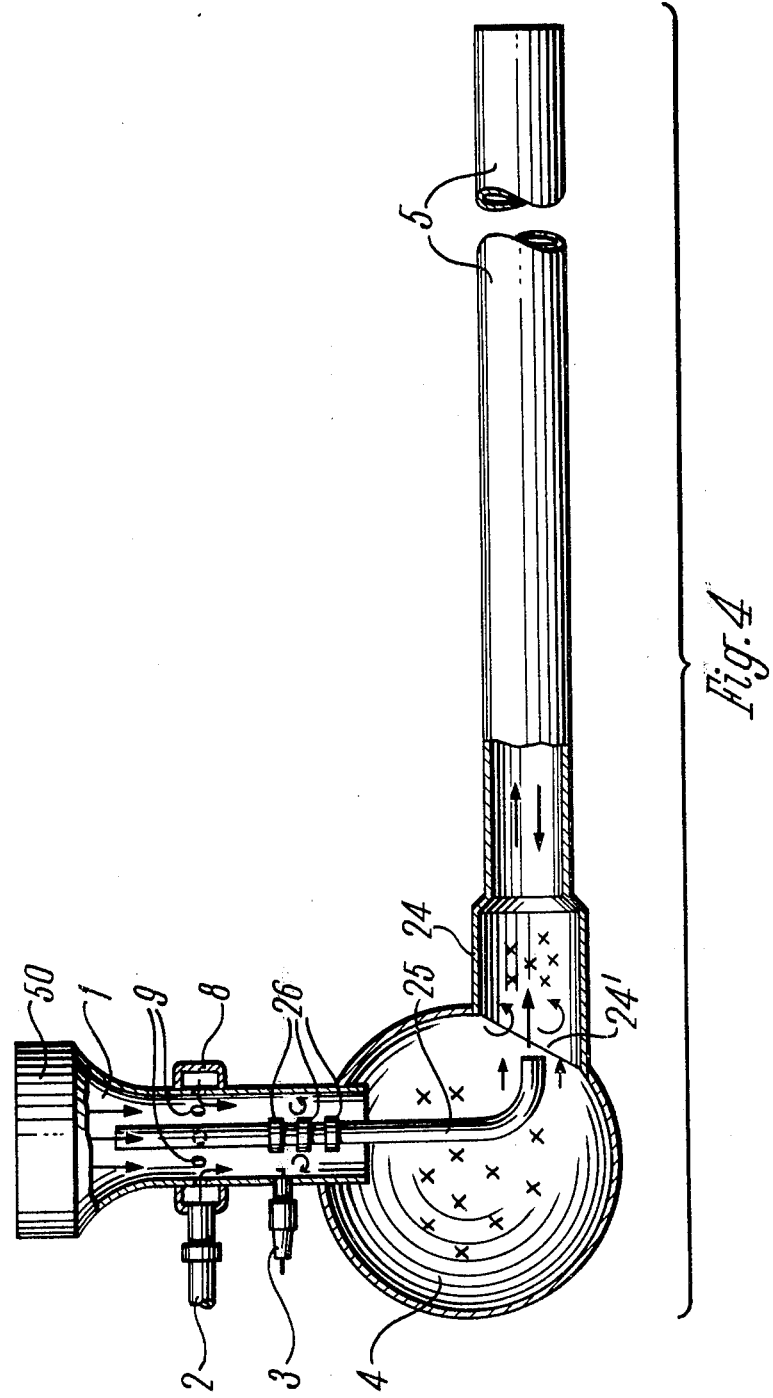
FIG. 4 is a broken out cross-sectional view of another embodiment in accordance with the present invention.

The resonant or pulsating combustion heating unit according to FIG. 1 consists of a suction pipe 1 with a check valve 50, a gas intake 2, a spark plug 3 (for start-up), a combustion chamber 4 and a pulsation tube 5, that empties into a accumulator 6 with an exhaust pipe 7. The gas intake 2 is formed by a gas intake channel 8 surrounding the suction pipe 1 with a plurality of holes (openings) through which the gas passes into the inside of the suction pipe 1. Subsequently, there is a mixing of the gas with the fresh air drawn in through the suction pipe. The gas/air mixture enters the combustion chamber 4 and explodes there, i.e., combusts explosively. The combustion is symbolized by the x's in the combustion chamber 4. The exhaust gas mixture enters the pulsation tube 5. In the pulsation tube a steady pulsing action is built up. This pulsation acts in a reverse manner into the combustion chamber 4, whereby the periodically lower pressure existing therein sucks new gas/air mixtures into the combustion chamber 4 automatically or causes an explosion of the same in the combustion chamber 4. After a start-up by activating the spark plug 3 a pulsating combustion (so-called Swingfire) is created in the combustion chamber 4.

As already previously described the problem is to guarantee the combustion as "clean" as possible, that is, to keep the carbon monoxide (CO), unburned hydrocarbon (HC) and nitrogen oxide ($NO_x$) components as low as possible. Thereby the lower the CO component in the exhaust gas, the lower the so-called air coefficient (it is defined as the air/fuel ratio and in stoichiometric combustion is equal to 1). It is apparent in itself that to achieve the elimination of CO, a lean fuel/air mixture should be selected, accordingly, the air coefficient should be regulated to be greated than 1, for example, 1.1 or 1.2. However, this has disadvantages in that the combustion of a lean mixture at the low combustion temperatures by means of the excess air, above in the start-up phase, is very difficult to keep steady. A certain amount of reserve in the direction of a lower air coefficient is always needed in order to guarantee a steady start up at low temperatures. However, even if this problem is solved, there is still the greater disadvantage in that the greater the excess of air, the higher the nitrogen oxide concentration in the exhaust gas mixture.

The invention is currently derived from the fact that the rich combustion, accordingly, with an air coefficient of less than 1, is conducted in the combustion chamber 4. Thus, it proceeds $NO_x$-deficient. Thereby, then yielding in the combustion chamber 4 an exhaust gas mixture with a still not optimally insignificant CO concentration. In order to avoid this, the pulsation tube is constructed so that an afterburning of the harmful components in the exhaust gas mixture formed by the combustion in the combustion chamber 4 occurs in it with the result that the carbon monoxide (CO) formed in the combustion chamber 4 is fully oxidized to carbon dioxide ($CO_2$) in the pulsating tube.

If a continuous flow of fresh air is supplied in the area where the combustion chamber 4 becomes the pulsation tube 5, an automatic afterburning occurs, since the temperature in the pulsation tube 5 is hot enough to ignite and adequately support it.

In the representative example according to FIG. 1 the influx of fresh air to the pulsation tube 5 takes place by means of a second suction pipe 10 that empties into a gas intake channel 11, which surrounds the suction pipe 5 in the area where it empties into the combustion chamber 4. For the purpose of mixing, the pulsation tube 5 contains a constriction in the form of ring-shaped channel 12, which produces a narrowing-cross-section 13 for the passage from the short piece 5' of the pulsation tube 5 to its longer section, into which the openings 14 of the channel 12 open, so that fresh air is sucked in by the passage of the exhaust gas mixture through the narrowing cross-section 13 and subsequently in the widening cross-section 13' in the direction of the flow after the opening 14 an intensive mixing occurs, as is indicated by the curved arrow. Then, as indicated by the x's, following that, the afterburning takes place, in which the CO and HC uncombusted in the combustion chamber 4 are fully combusted. $NO_x$ therein does not form since the combustion operation of the afterburning is the catching of the residual component from the exhaust gas of the main combustion and accordingly has merely a small part in the entire combustion operation. In a pulsating combustion system the pulsation tube connecting directly to the combustion chamber in itself has the parameters especially favorable with regard to a $NO_x$-deficient combustion, which by definition are the development of a $NO_x$-deficient afterburning. The main limiting quantities for the formation of the nitrogen oxides are the temperature, time and pressure components of the combustion process. These are, in so far as the pulsating combustion system, optimal, so that a steady afterburning develops without further adjustments especially with respect to the dimensions of the system. For it may be of primary importance that the temperature in the pulsation tube is considerably lower than that in the combustion chamber 4 so that the prerequisite for the afterburning in the pulsation tube of the noxious CO component originating in the combustion chamber 4 does not give rise to the formation of $NO_x$.

Thus, the pulsation tube acts as a late (combustion) reactor, in that an afteroxidation of the noxious CO exhaust gas component originating from the relatively rich combustion in the combustion chamber 4 still occurs; this makes it possible, the combustion in the combustion chamber 4 which provides from the heat balance point of view the major contribution to the heat conversion, to be accomplished extremely deficient in $NO_x$.

Great advantages are also apparent when considering the utilization of the energy from the combustion in the use of the pulsating combustion system as a heating source. The afterburnings, when they fully combust the components of the exhaust gas mixture not fully combusted in the combustion chamber 4, increases the thermal efficiency on utilization as a heating system, the heat from the outer surface of the pulsation tube is taken off and made usable in known ways. With the invention in this way a thermal efficiency of up to 99% can be attained. Measurements indicate that the concentration of CO and $NO_x$ in the exhaust gas (at the exhaust pipe 7) fall considerably below the values of the known systems.

FIG. 2 shows a modification of the representative example according to FIG. 1. The fresh air inlet at the beginning of the pulsation tube 5 is constructed so that the cross-section of the stream beyond the passage opening 15 of the combustion chamber 4 leading to the pulsation tube 5 widens sharply. In the area of widening cross-section 16 openings 17 are provided through which the fresh air can enter from the intake channel 18 into the pulsation tube, so that it is caught in the eddy created directly behind the ridge 19 so that an intensive mixing occurs.

FIG. 3 shows a further modification of the representative example according to FIG. 1. A short section of pipe 20 connects to the combustion chamber 4, which is surrounded by an intake channel 21 and which has openings 22 through which fresh air is drawn by the passage of the exhaust air mixture. Downstream just beyond the opening 22 is provided a widening cross-section 23 which causes eddying and thereby intensive mixing.

In general, in the FIGS. 1, 2 and 3 the widening cross-section 13, 16, 23 can be defined as means for mixing the fresh air sucked in at the entrance to the pulsation tube 5 with the exhaust gas mixture passing out of the combustion chamber 4 into the pulsation tube 5. For such a mixture a number of other possibilities are known so that the structural arrangement according to FIGS. 1 through 3 is to be viewed merely as an example, though particularly simple and advantageous.

As already explained, the combustion in the pulsation tube 5 is, as the afterburner, in comparison to the combustion in the combustion chamber 4, thereby characterized in that the air coefficient is greater than 1. Accordingly, there takes place a "lean" combustion in the pulsation tube 5, while the combustion taking place previously in the combustion chamber was "rich". The fresh air intake into the pulsation tube must be designed so that an excess of fresh air is provided in such a way that a lean combustion is produced. That can be easily determined by simple examination.

FIG. 4 shows further means by which fresh air is supplied. A relatively short section of pipe 24 between the combustion chamber 4 and the pulsation tube 5 is provided with a large cross-section. The intake of fresh air takes place by means of a pipe 25 that is passed through the combustion chamber from the suction pipe 1 and ends at the point of the passage opening 24 from the combustion chamber 4 into the section 24. The eddying of the fresh air takes place with gas emerging from the combustion chamber 4 at the point of passage of the fresh air into the pipe section 24. Thereby, at the same time is shown how the arrangement of the pipe 25 by its passing through the suction pipe 1 can take place so that the mixing of the air/fuel mixture in the combustion chamber is favored. That occurs by means of the collars 26 on the outside of the pipe 25.

In the representative example according to FIG. 5, as shown in FIG. 6, a crescent-shaped fresh air channel 27 is provided near the pulsation tube 5 at the side of the suction pipe 1, which ends with the suction pipe 1 inside the combustion chamber 4, however, in the vicinity of the passage opening 28 from the combustion chamber 4 to a section of pipe 24, which then empties into the pulsation tube in such a way that the exhaust gas mixture sucks the fresh air through the outlet openings 29 of the fresh air channel 27. The eddying or mixing of the fresh air takes place at the ridge-like transition point from the combustion chamber 4.

In a representative example according to FIG. 7, a geometric design of the suction pipe is provided to produce steric separation, that is the molecules of the fuel/air mixture are spacially separated from the fresh air molecules. This separation is produced in suction pipe 101 by separating the portion of the stream 33, formed of the fuel/air mixture, from a portion of the stream 32 which contains only fresh air not mixed with fuel. Only at the ridge 31 does a mixing of the fresh air portion of the stream not containing fuel 32 take place with the exhaust gas mixture emerging from the combustion chamber 104 into the pulsation tube 105.

In order to achieve this separation into the portions of stream 32, 33, the suction pipe 101 is curved. Then, one merely makes the use of the fact that these gas streams flowing parallel, beside one another at virtually the same velocity without some agitation mixes only slightly on their marginal surfaces; then employing the Coanda-effect, the retention of this flow is favored along the curved wall of the suction pipe. The eddying of the gas/air mixture takes place at the entrance to the combustion chamber 104 by means of the ridge 34. But, the fresh air stream 30 not exposed to the eddy is lead by means of the curved outer wall 135 of the combustion chamber 104 in the area between the transition of the suction pipe 101 into the combustion chamber 4 up to the transition into the pulsation tube 105, until it enters into the pulsation tube 105. Then it enters an eddying or mixing process at the ridge 31.

Thus for afterburning in the pulsation tube it may suffice, as shown in FIGS. 7 and 8, that it direct a fresh air portion of the stream from the suction pipe by way of the structural arrangement of the suction pipe, the combustion chamber and the suction pipe/combustion chamber and combustion chamber/pulsation tube transitions to pass through the combustion chamber into the pulsation tube, which does not take part in the combustion process in the combustion chamber, but mixes only on entrance into the pulsation tube with the exhaust gas mixture emerging from the combustion chamber.

The present invention may be embodied in other specific forms without departing from the spirit or essential attributes thereof and, accordingly, reference should be made to the appended claims, rather than to the foregoing specification as indicating the scope of the invention.

I claim:
1. A pulsating combustion heating apparatus, comprising:
   a combustion chamber;
   means for supplying a fuel/air mixture to the combustion chamber;
   a pulsation tube connected to said combustion chamber; and
   means for introducing fresh air into said pulsation tube at the forward end of the pulsating tube which is connected to said combustion chamber.
2. A pulsating combustion heating apparatus in accordance with claim 1 including means within said pulsation tube to mix said fresh air with the exhaust gases which enter from said combustion chamber into said pulsating tube.
3. A pulsating combustion heating apparatus in accordance with claim 2 wherein said means for mixing fresh air with the exhaust gases is formed by a widening of the cross-sectional area of the passageway from said combustion chamber into said pulsation tube.
4. A pulsating combustion heating apparatus in accordance with claim 2 wherein said means for mixing fresh air with the exhaust gases is formed by a ridge of turbulence at the passageway from said combustion chamber into said pulsation tube.
5. A pulsating combustion heating apparatus in accordance with claim 2 wherein said means for introducing fresh air into said pulsation tube is comprised of a pipe, which is connected to openings, in the pulsation tube at a portion of the pulsation tube which is of reduced cross-section.
6. A pulsating combustion heating apparatus, comprising:
   a combustion chamber;
   a mixing pipe connected to said combustion chamber;
   means to introduce air into said mixing pipe;
   means to introduce fuel into said mixing pipe;

a pulsation pipe connected to said combustion chamber;

a passageway from said combustion chamber to said pulsation pipe; and duct means provided within said mixing pipe and connected to said air introducing means, said duct means opening into the combustion chamber at a predetermined position sufficiently close to the connection of said passageway to said combustion chamber and at an angle determined to allow air to flow from said duct means into said passageway along the wall of said combustion chamber.

7. A pulsating combustion heating apparatus, comprising:

a combustion chamber;

a mixing pipe connected to and opening into said combustion chamber at a predetermined angle;

means for introducing air into said mixing pipe and generating an air stream through said mixing pipe to said combustion chamber;

means to introduce fuel into a cross-sectional portion of said air stream;

means at the entrance of the mixing pipe into said combustion chamber to effect a turbulence of said portion of the air stream, into which fuel has been introduced by said air introducing means;

a pulsation pipe connected to said combustion chamber at a second predetermined angle; and said first and second predetermined angles being selected such that the portion of the air stream into which no fuel has been introduced flows from the entrance of the mixing pipe into the combustion chamber to the pulsating pipe along the wall of said combustion chamber.

* * * * *